United States Patent
Takeoka

(10) Patent No.: US 7,315,343 B2
(45) Date of Patent: Jan. 1, 2008

(54) LIQUID CRYSTAL DISPLAY DEVICE

(75) Inventor: Masahiko Takeoka, Yamatokoriyama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 383 days.

(21) Appl. No.: 11/144,936

(22) Filed: Jun. 6, 2005

(65) Prior Publication Data

US 2006/0012590 A1   Jan. 19, 2006

(30) Foreign Application Priority Data

Jun. 7, 2004  (JP)  ............................. 2004-168590

(51) Int. Cl.
*G02F 1/1333*  (2006.01)
(52) U.S. Cl. .................. 349/161; 349/72; 349/188; 345/101; 257/59
(58) Field of Classification Search .................. 349/72, 349/161, 188; 345/101; 257/59
See application file for complete search history.

(56) References Cited

U.S. PATENT DOCUMENTS 5,744,819 A * 4/1998 Yamamoto et al. ........... 257/59
5,929,833 A * 7/1999 Koshobu et al. ............ 345/101
2003/0107546 A1* 6/2003 Ham ......................... 345/101

FOREIGN PATENT DOCUMENTS

JP   2002-250909   9/2002

* cited by examiner

*Primary Examiner*—Terrell L. McKinnon
*Assistant Examiner*—Jessica M Merlin
(74) *Attorney, Agent, or Firm*—Oblon, Spivak, McClelland, Maier & Neustadt, P.C.

(57) ABSTRACT

A liquid crystal display device comprises a liquid crystal display panel including a liquid crystal layer for a display in an OCB mode, a heating unit which heats the liquid crystal display panel, a temperature detecting unit for detecting a temperature of the liquid crystal display panel, a time measuring unit which measures a heating time that the heating unit has operated, and a transfer drive circuit which applies a transfer drive voltage to the liquid crystal layer to transfer the alignment state of liquid crystal molecules from a splay alignment to a bend alignment in advance. The transfer drive circuit is configured to determine a transfer time as an application period of the transfer drive voltage on the basis of a relationship between the heating time and temperature which are obtained from the time measuring unit and temperature detecting unit at a desired timing.

4 Claims, 7 Drawing Sheets

| X1<br>(TFT-1) | X2<br>(TFT-2) | X1<br>(TFT-3) | X2<br>(TFT-4) | X3<br>(TFT-5) | X4<br>(TFT-6) |
|---|---|---|---|---|---|
| + | − | + | − | + | − |
| − | + | − | + | − | + |
| + | − | + | − | + | − |
| − | + | − | + | − | + |
| + | − | + | − | + | − |
| − | + | − | + | − | + |

(b)

| X1<br>(TFT-1) | X2<br>(TFT-2) | X1<br>(TFT-3) | X2<br>(TFT-4) | X3<br>(TFT-5) | X4<br>(TFT-6) |
|---|---|---|---|---|---|
| − | + | − | + | − | + |
| + | − | + | − | + | − |
| − | + | − | + | − | + |
| + | − | + | − | + | − |
| − | + | − | + | − | + |
| + | − | + | − | + | − |

LIQUID CRYSTAL DISPLAY DEVICE

CROSS-REFERENCE TO RELATED APPLICATIONS

This application is based upon and claims the benefit of priority from prior Japanese Patent Application No. 2004-168590, filed Jun. 7, 2004, the entire contents of which are incorporated herein by reference.

BACKGROUND OF THE INVENTION

1. Field of the Invention

The present invention relates to a liquid crystal display device, and more particularly, to a liquid crystal display device capable of providing a wide viewing angle and high-speed response.

2. Description of the Related Art

Currently, a liquid crystal display panel utilizing characteristics such as lightness, thinness, and low power consumption is used as a display for use in television sets, personal computers and car navigation systems.

A twisted nematic (TN) type liquid crystal display panel widely utilized as this liquid crystal display panel is configured such that a liquid crystal material having optically positive refractive anisotropy is set to a twisted alignment of substantially 90° between glass substrates opposed to each other, and optical rotary power of incident light is adjusted by controlling the twisted alignment. Although this TN-type liquid crystal display panel can be comparatively easily manufactured, its viewing angle is narrow, and its response speed is low. Thus, this panel has been unsuitable to display a moving image such as a television image, in particular.

On the other hand, an optically compensated birefringence (OCB) type liquid crystal display panel attracts attention as a liquid crystal display panel which improves a viewing angle and a response speed. The OCB-type liquid crystal display panel is formed using a liquid crystal material sealed between the opposed glass substrates and capable of providing a bend alignment. The response speed is improved by one digit as compared with the TN-type liquid crystal display panel. Further, there is an advantage that the viewing angle is wide because optically self compensation is made from the alignment state of the liquid crystal material.

In the OCB-type liquid crystal display panel, as shown in (a) of FIG. 6, a liquid crystal layer having liquid crystal molecules 65 is disposed between a pixel electrode 62 disposed on a glass based array substrate 61 and an counter electrode 64 disposed similarly on a glass based counter substrate 63 which is opposed to the array substrate 61. The liquid crystal molecules 65 of the liquid crystal layer are set to a splay alignment when no voltage is applied. Thus, a high voltage of the order of some tens of voltages is applied between the pixel electrode 62 and the counter electrode 64 upon supply of power so as to transfer the liquid crystal molecules 65 from the splay alignment which is a non-display state to the bend alignment which is a display state.

To reliably transfer the alignment state upon high voltage application, voltages opposite in polarity are applied to adjacent horizontal lines of the pixels to create a nucleus by a laterally twisted potential difference between the adjacent pixel electrode 62 and transfer pixel electrode. The alignment state is transferred around the nucleus. Such an operation is carried out for substantially one second, whereby the splay alignment is transferred to the bend alignment. Further, a potential difference between the pixel electrode 62 and the counter electrode 64 is equalized, thereby temporarily eliminating an undesired record.

After the liquid crystal molecules 65 have been thus transferred to the bend alignment, a voltage exceeding a low OFF voltage, at which the liquid crystal molecules 65 are maintained in the bend alignment as shown in (b) of FIG. 6, is applied from a drive power supply 66 during operation. The OFF voltage or an ON voltage which is higher than the OFF voltage is applicable from the drive power supply 66 as shown in (c) of FIG. 6. Thus, the drive voltage between the electrodes 62 and 64 changes in the range of the OFF voltage to the ON voltage. Consequently, the liquid crystal molecules 65 are transferred between the bend alignment shown in (b) of FIG. 6 and the bend alignment shown in (c) of FIG. 6 to change a retardation value of the liquid crystal layer, thereby controlling transmittance.

In the case where an OCB-type liquid crystal display panel is used for displaying an image, birefringence is controlled in association with polarizing plates. The liquid crystal panel is driven by a driver circuit such that light is shielded (for a black display) upon application of a high voltage and is transmitted (for a white display) upon application of a low voltage, for example.

The driver circuit includes a scanning line driver circuit 67 which is formed integrally on the array substrate 61 as shown in FIG. 7 and from which a plurality of scanning lines Y1 to Yn extend in a row direction, and a signal line driver circuit (not shown) from which a plurality of signal lines X1 to Xm extend in a column direction to intersect the scanning lines Y1 to Yn.

The signal lines X1 to Xm are divided into odd numbered signal lines X1, X3, . . . and even numbered signal lines X2, X4, . . . , and drain-source paths of thin film transistors (TFTs) 68-1, 68-2, . . . 68-m' (m'=2 m) configured as a pair of selector switches on an even number and odd number basis are connected to the respective signal lines X1 to Xm in parallel with each other. Among them, gates of TFTs 68-1, 68-3, . . . of an odd numbered set is connected to a terminal 69 to which a first selection signal is supplied, and gates of TFTs 68-2, 68-4, . . . of an even numbered set is connected to a terminal 70 to which a second selection signal is supplied, so that a video signal supplied to each of terminals 71, 72 is selected by the corresponding selection signal.

Switching thin film transistors (TFTs) 73 are disposed at intersections between the scanning lines Y and the signal lines X in which the drain-source paths of the TFTs 68-1 to 68-m' are inserted. Each TFT 73 has a gate connected to one of the scanning lines Y1 to Yn, and a drain-source path connected at one end to one of the signal lines X. The other end of the drain-source path of the TFT 73 is connected to a liquid crystal capacitance element 74, and is connected to one end of a storage capacitance element 75. The other end of the storage capacitance element 75 is connected to a terminal 76 via a capacitance line Cs, and a storage capacitance voltage is applied from the terminal 76.

In addition, a vertical scanning clock signal and a vertical start signal are supplied to the scanning line driver circuit 67 via a terminal 77 and a terminal 78, respectively.

With such a configuration, a gate pulse from the scanning line driver circuit 67 is sequentially supplied to the scanning lines Y1 to Yn by line-at-a-time driving method, and TFTs 73 on one scanning line X are turned on simultaneously. In synchronism with this scanning, video signals from the signal line driver circuit are supplied via the terminals 71, 72 and the TFTs 68-1 to 68-m' to the TFTs 73, to store a signal charge in each liquid crystal capacitance element 74 and the corresponding storage capacitance element 75 through the drain-source path of the corresponding TFT 73. The signal charge is held until a next scanning period has been established. Consequently, the liquid crystal capacitance elements 74 of all pixels connected to the scanning lines X are activated to display an image, the storage capacitance elements 75 are driven by a storage capacitance voltage which is applied by grounding the terminal 76 or by supplying a gate pulse in a reverse phase and supplied to the terminal 76.

In such a liquid crystal display panel, for example, in a first half of one horizontal scanning period (1H), a signal voltage having positive polarity (+) with respect to a voltage of the counter electrode 64 is written into the pixel electrode 62 connected via the TFT 68-1 for the signal line X1, and a signal voltage having negative polarity (−) with respect to a voltage of the counter electrode 64 is written into the pixel electrode 62 connected to the TFT 68-4 for the signal line X2, respectively, as shown in (a) of FIG. 8.

In a latter half of 1H, a signal voltage having negative polarity (−) with respect to a voltage of the counter electrode 64 is written into the pixel electrode 62 connected via the TFT 68-2 for the signal line X2, a signal voltage having positive polarity (+) with respect to a voltage of the counter electrode 64 is written into the pixel electrode 62 connected via the TFT 68-3 for the signal line X1.

In addition, in a next frame, in a first half of 1H, a signal voltage having negative polarity (−) with respect to a voltage of the counter electrode 64 is written into the pixel electrode 62 connected to via the TFT 68-1 for the signal line X1, and a signal voltage having positive polarity (+) with respect to a voltage of the counter electrode 64 is written into the pixel electrode 62 connected via the TFT 68-4 for the signal line X2, respectively, as shown in (b) of FIG. 9.

In a latter half of 1H, a signal voltage having positive polarity (+) with respect to a voltage of the counter electrode 64 is written into the pixel electrode 62 connected via the TFT 68-2 for the signal line X2, and a signal voltage having negative polarity (−) with respect to a voltage of the counter electrode 64 is written into the pixel electrode 62 connected via the TFT 68-3 for the signal line X1. In this manner, frame inversion driving and dot inversion driving are carried out, thereby preventing an application of an undesired direct current voltage and preventing an occurrence of flickering.

In such an OCB-type liquid crystal display panel, the alignment state can be changed from the splay alignment to the bend alignment by means of a voltage applied between the display pixel electrode 62 and the opposed electrode 64.

However, in the OCB-type liquid crystal display panel, which applies a transfer drive voltage in an initial stage of a display operation, a transfer time from the splay alignment to the bend alignment greatly depends on a temperature of the liquid crystal display panel. In other words, when the temperature of the liquid crystal display panel is high, it is required that the transfer drive voltage be applied for a longer period of time. On the other hand, when the temperature is low, it is required that the transfer drive voltage be applied for a shorter period of time.

That is, a relationship between the temperature of the liquid crystal display panel and transfer time is shown in FIG. 9 as the transfer time characteristics in which the transfer time is comparatively short when the temperature of the liquid crystal display panel is high, and is long when the temperature of the liquid crystal panel is low.

As a general heating unit, a backlight serves to heat the liquid crystal display panel. However, it is believed that, in order to reduce the time of transfer driving to the minimum, a heater 83 is provided near the liquid crystal display 80 and connected to a heating power supply 82 as a heating unit 81 for heating a liquid crystal display panel 80, as shown in FIG. 10, and a thermal sensor 84 for sensing the temperature of the liquid crystal display panel 80 is provided near the liquid crystal display panel 80.

The thermal sensor 84 is connected to a temperature detecting unit 85 to detect the temperature of the liquid crystal display panel 80. Now, assuming that power has been supplied in order to transfer the splay alignment to the bend alignment, the temperature of the liquid crystal display panel 80 is sensed at the thermal sensor 84, and the temperature is detect or measured by the temperature detecting unit 85. An initial transfer time is set by an initial transfer time setting unit 86 on the basis of the initially detected temperature, and a transfer drive unit is driven by a control signal based on this information. An output of the transfer drive unit 87 is designed so as to be supplied to the liquid crystal display panel 80 via a gate and a source driver 89 controlled by a controller 88.

With such a configuration, the temperature of the liquid crystal display panel 80 is sensed by the thermal sensor 84, and a transfer drive voltage initially set corresponding to the temperature is supplied to the liquid crystal display panel 80, thereby making the liquid crystal display panel 80 operable.

In the case where such a liquid crystal display panel is used as a display device for a television set, this display panel is used under a condition in which the ambient temperature of the flat display device ranges from about 0 to 60° C., and a backlight serves as the heating unit 81 of the liquid crystal display panel 80. Further, in the case where the flat display device is used as a display for a car navigation system, the use under a severe condition such as a very hot desert area or a very cold area is presumed. Thus, it is presumed that the external environment of the system used largely changes, and consequently, the ambient temperature of the liquid crystal display panel significantly changes from below 0° C. to about 80° C. The use under an environment condition which is severer than the use in room such as a television set is unavoidable. Therefore, the heater 83 for use in heating is often used in addition to the backlight, thus making it necessary to set the operating condition of the liquid crystal panel to a use condition adapted to the external environment. In particular, in a low temperature state such as −20° C. or less, a large amount of time has been required for heating until the liquid crystal display panel 80 reaches within the range of the predetermined applicable operating temperatures, and a large amount of time such as several tens of seconds is required at the time of a low temperature as the degree of thermal effect that the transfer time affects on a temperature.

In the case where such an OCB-type liquid crystal display panel is used as the display device, an initial temperature of the liquid crystal display panel 80 is detected using the thermal sensor 84 and the temperature detecting unit 85 when the device is initially powered on. After the heating time has been set according to the initial temperature, the liquid crystal display panel 80 has been heated by the heater 83 as required.

However, it is necessary to sufficiently heat the liquid crystal display panel 80 in order to reliably carry out the initial transfer operation of the OCB-type liquid crystal display panel 80. It is unknown what degree of time is required according to a temperature difference of the liquid crystal display panel 80 to efficiently obtain a predetermined temperature for starting transfer drive. In other words, it is unknown whether or not a total of the heating time and transfer time can be minimized. Since it is necessary to provide a sufficient time margin to establish a state suitable for the initial transfer, there has occurred a problem that a large amount of time is required before start of initial transfer driving.

BRIEF SUMMARY OF THE INVENTION

The present invention has been made in order to solve the foregoing problem. It is an object of the present invention to provide a liquid crystal display device in which the alignment state of liquid crystal molecules can be quickly transferred from a splay alignment to a bend alignment in a variety of temperature environment.

According to a first aspect of the present invention, there is provided a liquid crystal display device comprising: a liquid crystal display panel including a liquid crystal layer for a display in an OCB mode; a heating unit which heats the liquid crystal display panel; a temperature detecting unit for detecting a temperature of the liquid crystal display panel; a time measuring unit which measures a heating time that the heating unit has operated; and a transfer drive circuit which applies a transfer drive voltage to the liquid crystal layer to transfer the alignment state of liquid crystal molecules from a splay alignment to a bend alignment in advance; wherein the transfer drive circuit is configured to determine a transfer time as an application period of the transfer drive voltage on the basis of a relationship between the heating time and temperature which are obtained from the time measuring unit and temperature detecting unit at a desired timing.

According to a second aspect of the present invention, there is provided a liquid crystal display device, wherein the transfer drive circuit is configured to start application of the transfer drive voltage upon start of heating by the heating unit.

According to a third aspect of the present invention, there is provided a liquid crystal display device, wherein the transfer drive circuit includes an initial transfer time setting unit which sets the transfer time for an expected rise in temperature and a transfer time switching unit which updates the transfer time when a predetermined temperature is detected by the temperature detecting unit.

According to a fourth aspect of the present invention, there is provided a liquid crystal display device, wherein the initial transfer time setting unit is configured to set the transfer time according to an output of the temperature detecting unit.

In these liquid crystal display devices, the transfer drive circuit determines the transfer time as an application period of the transfer drive voltage on the basis of a relationship between the heating time and temperature which are obtained from the time measuring unit and temperature detecting unit at a desired timing. Thus, it is possible to quickly transfer the alignment state of liquid crystal molecules from a splay alignment to a bend alignment in a variety of temperature environment. As a result, transfer efficiency for each temperature is improved in transfer driving carried out upon application of power. This reduces the mental stress applied on a user who waits during the period for the transfer driving.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 explains a method for driving the liquid crystal display panel shown in FIG. 7;

DETAILED DESCRIPTION OF THE INVENTION

A liquid crystal display device according to one embodiment of the present invention will be described in detail with reference to the accompanying drawings.

Figure 1:
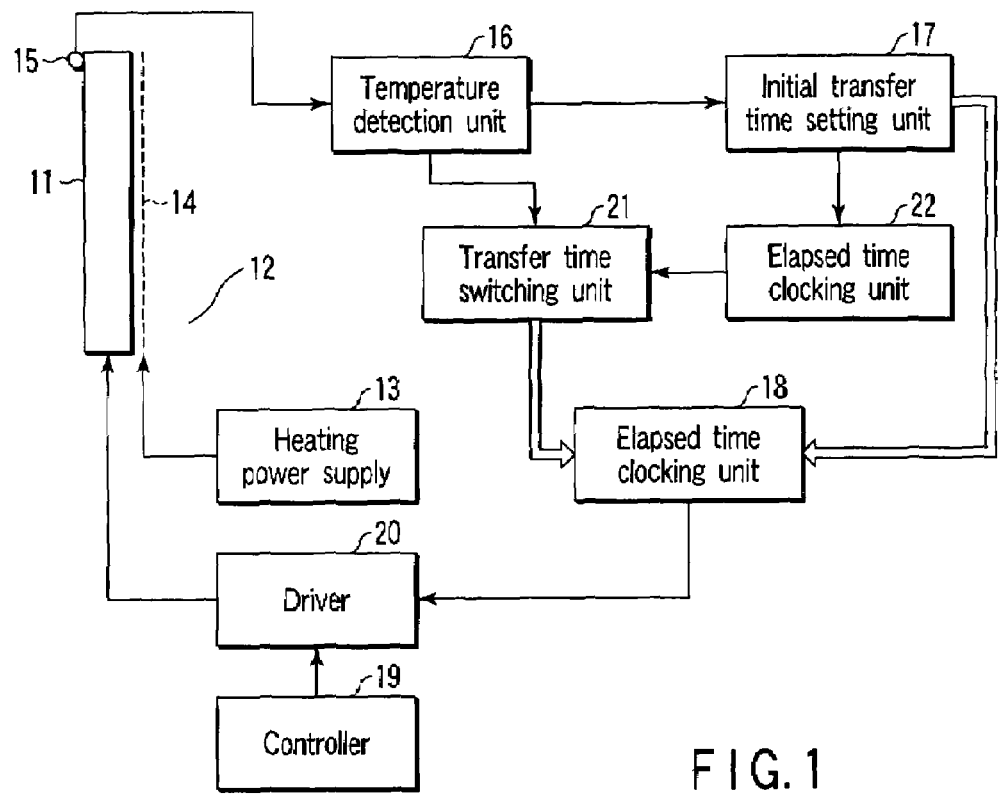
FIG. 1 is a diagram showing the circuit configuration of a liquid crystal display device according to one embodiment of the present invention.

In the liquid crystal display device, as shown in FIG. 1, a heater 14 is provided near the liquid crystal display panel 11 on the back side opposite to a display screen as a heating unit 12, and is connected to a heating power supply 13 for selectively supplying power that allows the heater 14 to heat as required. A thermal sensor 15 is installed for sensing a temperature of the liquid crystal display panel 11.

On the other hand, the thermal sensor 15 is connected to a temperature detecting unit 16 so as to detect or measure the temperature of the liquid crystal display panel 11. Information on the detected temperature is supplied to an initial transfer time setting unit 17. The initial transfer time setting unit 17 sets an initial transfer time based on the detected temperature and drives a transfer drive unit 18 according to the initial transfer time. That is, a transfer drive voltage is supplied to a driver 20 controlled by a controller 19 to carry out transfer driving of the liquid crystal display panel 11. It is desirable that a thermister is used as the thermal sensor 15 in the case of a television set or the like where a use temperature ranges from about 0 to 60° C., and that a digital temperature sensor is used as the thermal sensor 15 in the case of a car navigation system or the like where a use temperature widely ranges from below-freezing point to about 80° C.

Further, an output detected by the temperature detecting unit 16 is supplied to a transfer time switching unit 21 as well. Elapsed time information from a transfer start elapsed time clocking unit 22 for clocking an elapsed time based on the initial transfer time information from the initial transfer time setting unit 17 is also input to the transfer time switching unit 21. Thus, the transfer time switching unit 21 monitors time information from the initial transfer start required for the liquid crystal display panel 11 to the reach of a predetermined temperature.

The liquid crystal display panel 11, the controller 19, the driver 20 and the like employ the same configuration as conventionally, and a detailed description of these components is omitted here.

Figure 2:
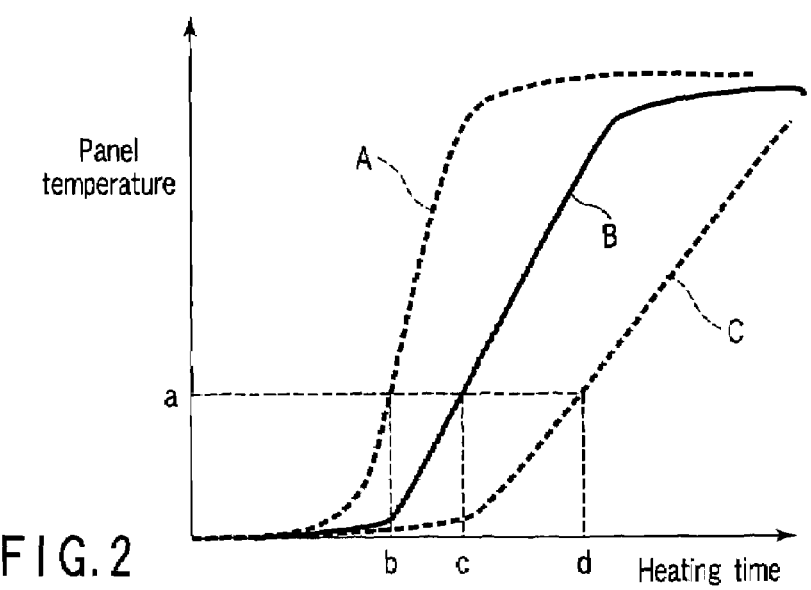
FIG. 2 is a graph showing heating time characteristics applied to the liquid crystal display device shown in FIG. 1.

In the heating time characteristics of the liquid crystal display panel 11, as shown in FIG. 2, there is a difference in heating time for a predetermined temperature to be reached depending on the initial temperature of the liquid crystal display panel 11. The heating time for the predetermined temperature to be reached is monitored, thereby making it possible to presume certain heating characteristics. For example, some heating time characteristics (A, B, C in the figure) are preset by experimentation or the like, and an elapsed time for the liquid crystal display panel 11 to reach a predetermined temperature "a" is read, thereby determining the heating time required for a temperature set based on the preset heating time characteristics.

Now, assuming that a temperature of the liquid crystal display panel 11 has reached the predetermined temperature "a", the heating time characteristics which is the closest in view of the transfer start elapsed time for the predetermined temperature "a" to be reached are selected, and the heating time is presumed depending on the selected characteristics. That is, if an elapsed time for the predetermined temperature "a" to be reached requires "b" time, characteristic A is selected; if it requires "c" time, characteristic B is selected, and if it requires "d" time, characteristic C is selected. Therefore, it becomes possible to predict a heating time from the selected heating time characteristics to the reach of a transfer enable state. With respect to the heating time characteristics, it is possible to determine more detailed heating time as long as a number of characteristics are prepared. However, a memory is required to maintain the characteristic data. Thus, although it is preferable that plural items of characteristic data are maintained, the number of items of characteristic data can be determined freely.

Figure 3:
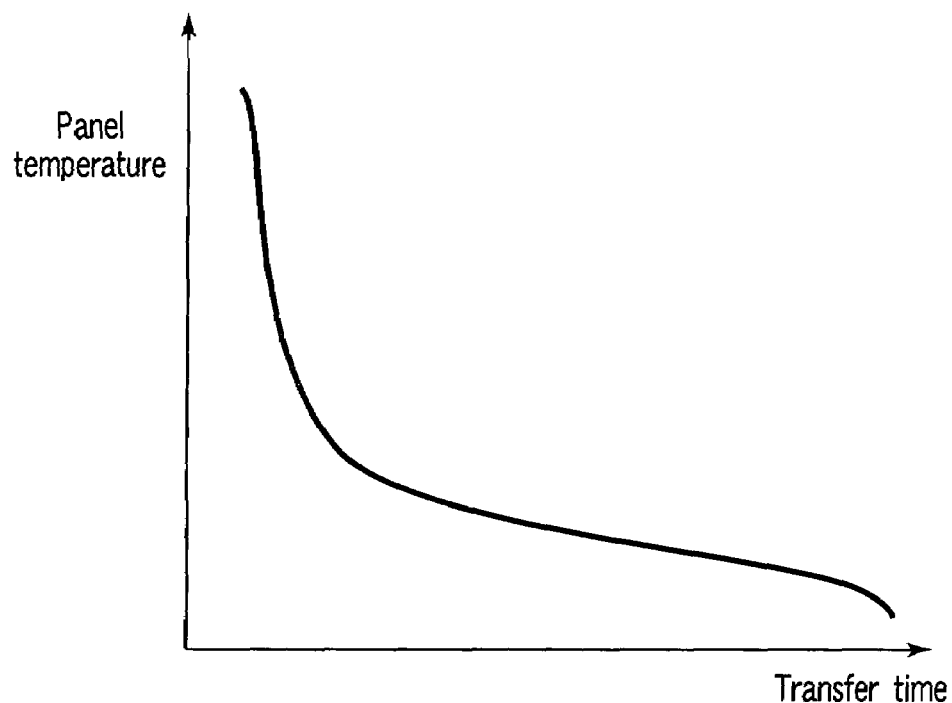
FIG. 3 is a graph showing transfer time characteristics applied to the liquid crystal display device shown in FIG. 1.

When the predetermined heating time characteristic is thus selected, estimation of a heating time is made, and concurrently, a transfer time is set. That is, independently of setting of the initial transfer time, updating of the transfer time is carried out on the basis of the transfer time characteristics indicating the transfer time for the panel temperature of the liquid crystal display panel 11 as shown in FIG. 3. Subsequently, the information supplied from the initial transfer time setting unit 17 is switched to information of the new updated transfer time and this information is supplied to the transfer drive unit 18.

Figure 4:
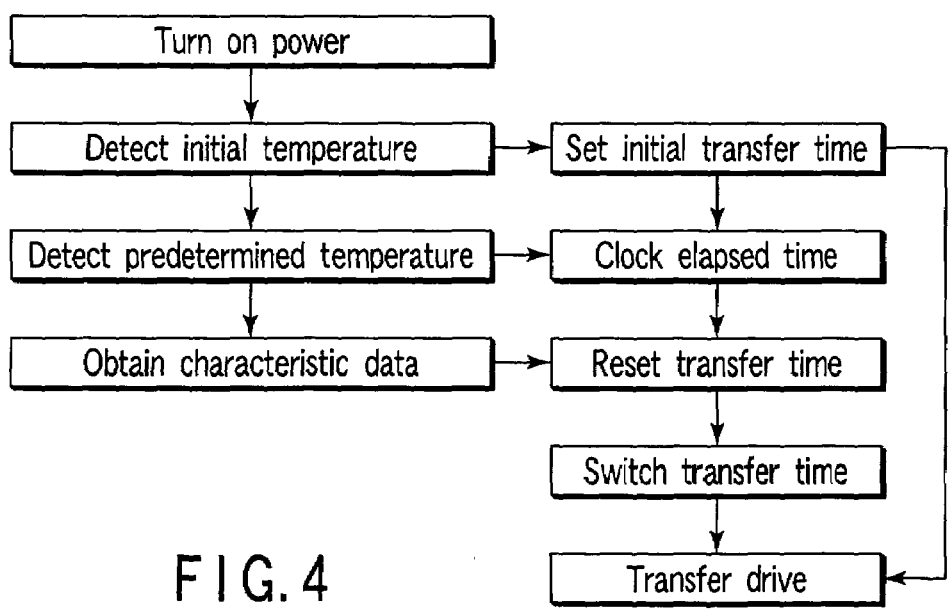
FIG. 4 is a flow chart for explaining transfer drive of the liquid crystal display shown in FIG. 1.

That is, as shown in FIG. 4, when the liquid crystal display device is powered ON, the initial temperature of the liquid crystal display panel 11 is sensed by the thermal sensor 15, and the initial temperature of the liquid crystal display panel 11 is detected by the temperature detecting unit 16. The initial transfer time is set in response to detection of the initial temperature, and first, initial transfer driving is carried out. After the initial transfer driving has been carried out, the temperature of the liquid crystal display panel 11 is then continuously sensed by the thermal sensor 15. The temperature unit 16 detects that a predetermined temperature has been reached after heating by the heating unit 12.

When this predetermined temperature has been detected, an elapsed time required for the predetermined temperature to be detected from a time at which the initial temperature has been detected is computed by the transfer start elapsed time clocking unit 22, and the elapsed time information is supplied to the transfer time switching unit 21. In the transfer time switching unit 21, the heating transfer time characteristic conforming to elapsed time information for the predetermined temperature to be reached is selected from among the heating transfer time characteristic data based on the transmitted elapsed time information. The shortest time for the liquid crystal display panel 11 to reach a desired temperature is computed so as to reset or update the transfer time. In order to control the transfer drive unit 18 such that transfer driving is carried out based on the new updated transfer time, the initial transfer time is switched to the updated transfer time by the transfer time switching unit 21.

In this manner, the surface temperature of the display panel 11 is monitored, and an elapsed time from the initial temperature to the predetermined temperature is clocked. From both of the data between the clocked time and a predetermined temperature, i.e., from among a variety of heating transfer time characteristic data stored in advance, the heating transfer characteristic data which is the closest thereto is read out. Based on the data, the heating time and transfer time for a desired temperature to be reached are updated, whereby the shortest time for the liquid crystal display panel 11 to reach the desired temperature is set, and transfer driving is carried out. This makes it possible to reduce a time loss for transfer driving to be carried out, and an operation of transfer driving can be smoothly carried out, enabling improvement of transfer efficiency and reduction of the user's stress for a waiting time.

In the above description, although the transfer start elapsed time is clocked for the temperature of the initially detected liquid crystal display panel 11 to reach a predetermined temperature, and the most suitable transfer time is identified from the clocked time information and desired temperature information, it is possible to utilize these items of information in a reversed manner.

That is, in the above description, when the liquid crystal display panel 11 is powered on, the initial temperature of the liquid crystal display panel 11 is detected. At the same time, transfer driving for a transfer time set by the initial transfer time setting unit 17 is carried out. When a predetermined elapsed time has been clocked by the transfer start elapsed time clocking unit 22, the temperature of the liquid crystal display panel 17 is measured to select the heating transfer time characteristic data which is the closest to the temperature information for the predetermined elapsed time and then update the transfer time based on the data.

In this case, the temperature of the liquid crystal display panel 11 is monitored based on the transfer start elapsed time regardless of the initial temperature of the liquid crystal display panel 11. Thus, a large amount of distortion occurs with the measured temperatures in accordance with an external environment. Therefore, in order to select the heating transfer time characteristic data which is the closest to information of a temperature detected after the predetermined elapsed time, it is necessary to store a number of items of heating transfer time characteristic data. In this method, an approximate one of the heating transfer time characteristic data can be quickly searched for and selected, even if the predetermined transfer start elapsed time is set to be short. Therefore, there is no need for waiting until the liquid crystal display panel reaches the predetermined temperature, thus making it possible to update the transfer time more quickly as compared with the method for clocking the transfer start elapsed time.

While the above embodiment has described a case in which the elapsed time is clocked by the transfer start elapsed time clocking unit 22 so as to update and switch the transfer time utilizing the clocked elapsed time, it is possible to configure a more simplified liquid crystal display device instead of the transfer start elapsed time clocking unit 22.

Figure 5:
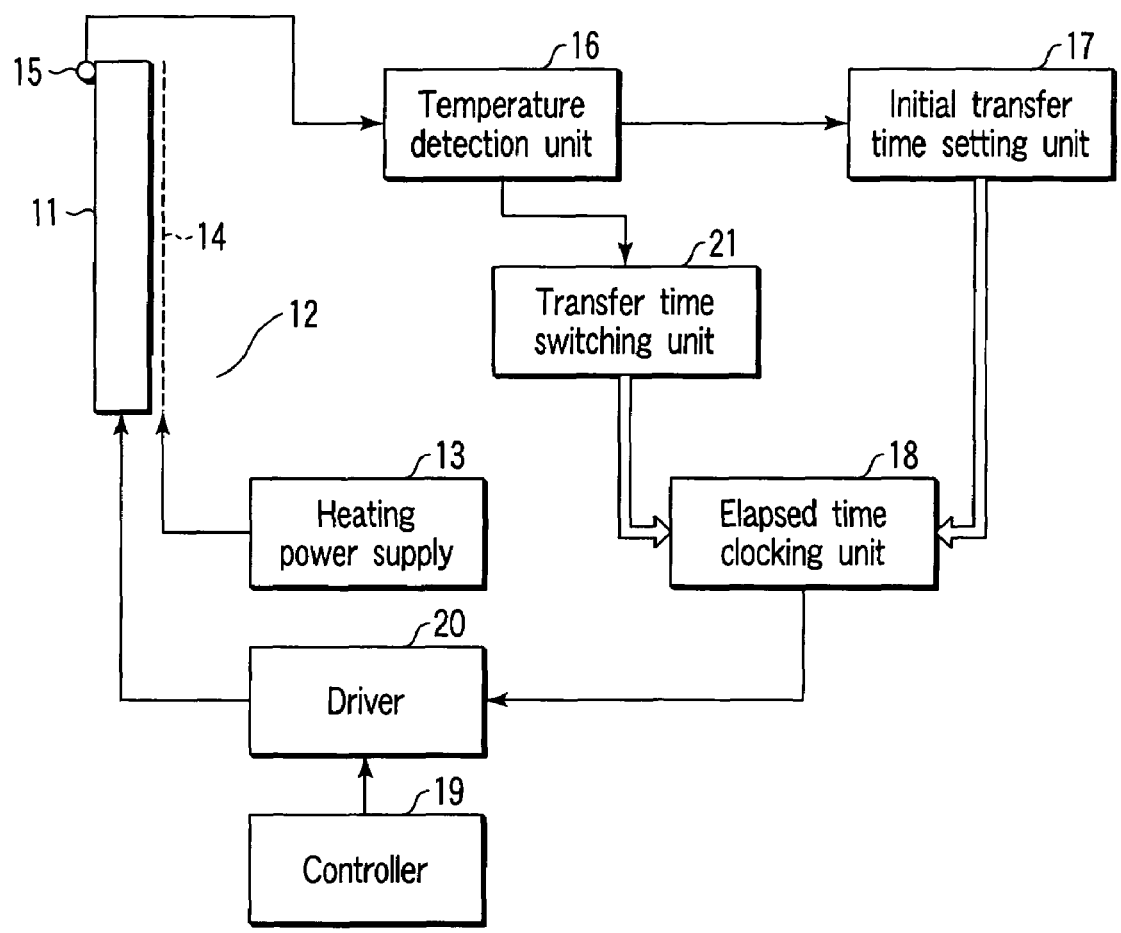
FIG. 5 is a diagram showing a modification of the circuit configuration of the liquid crystal display device shown in FIG. 1.
Figure 6:
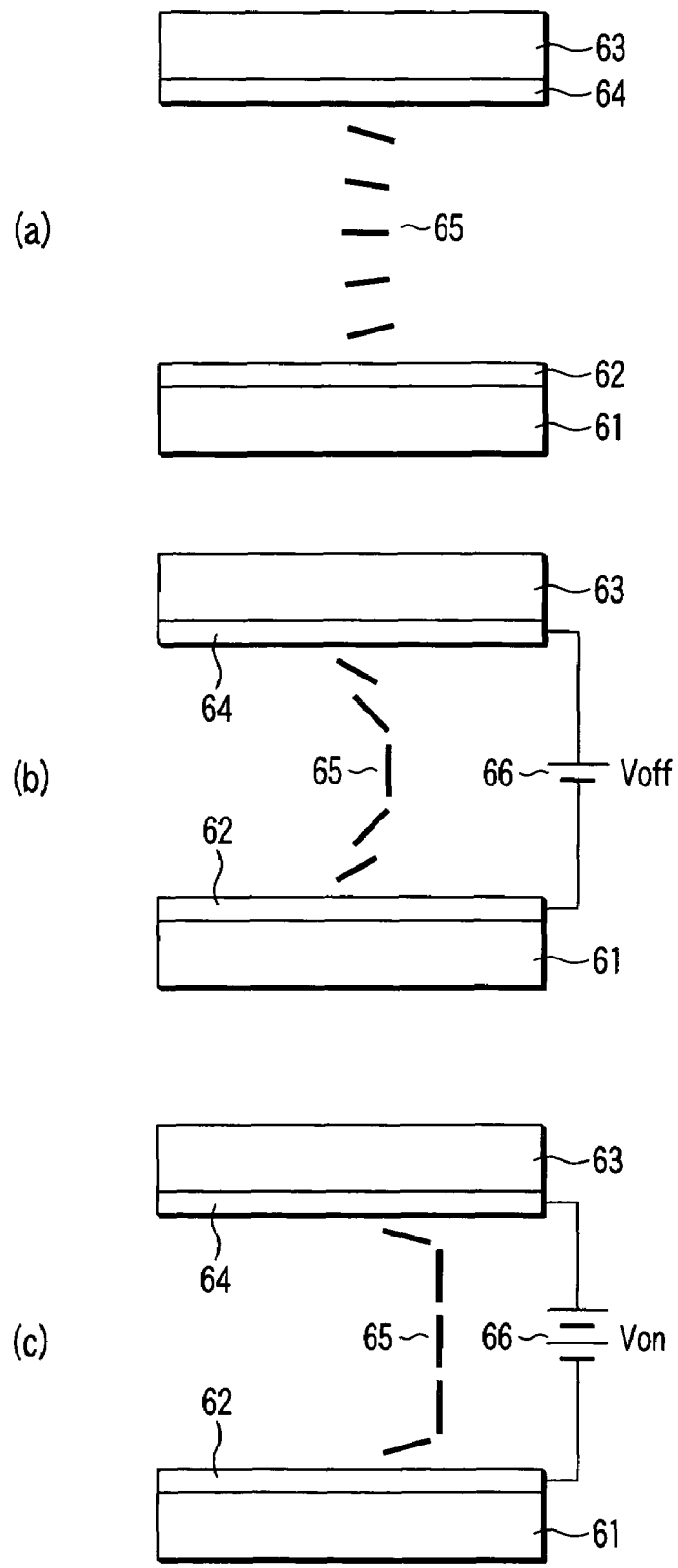
FIG. 6 is a view for explaining a display principle of a conventional OCB-type liquid crystal display panel.
Figure 7:
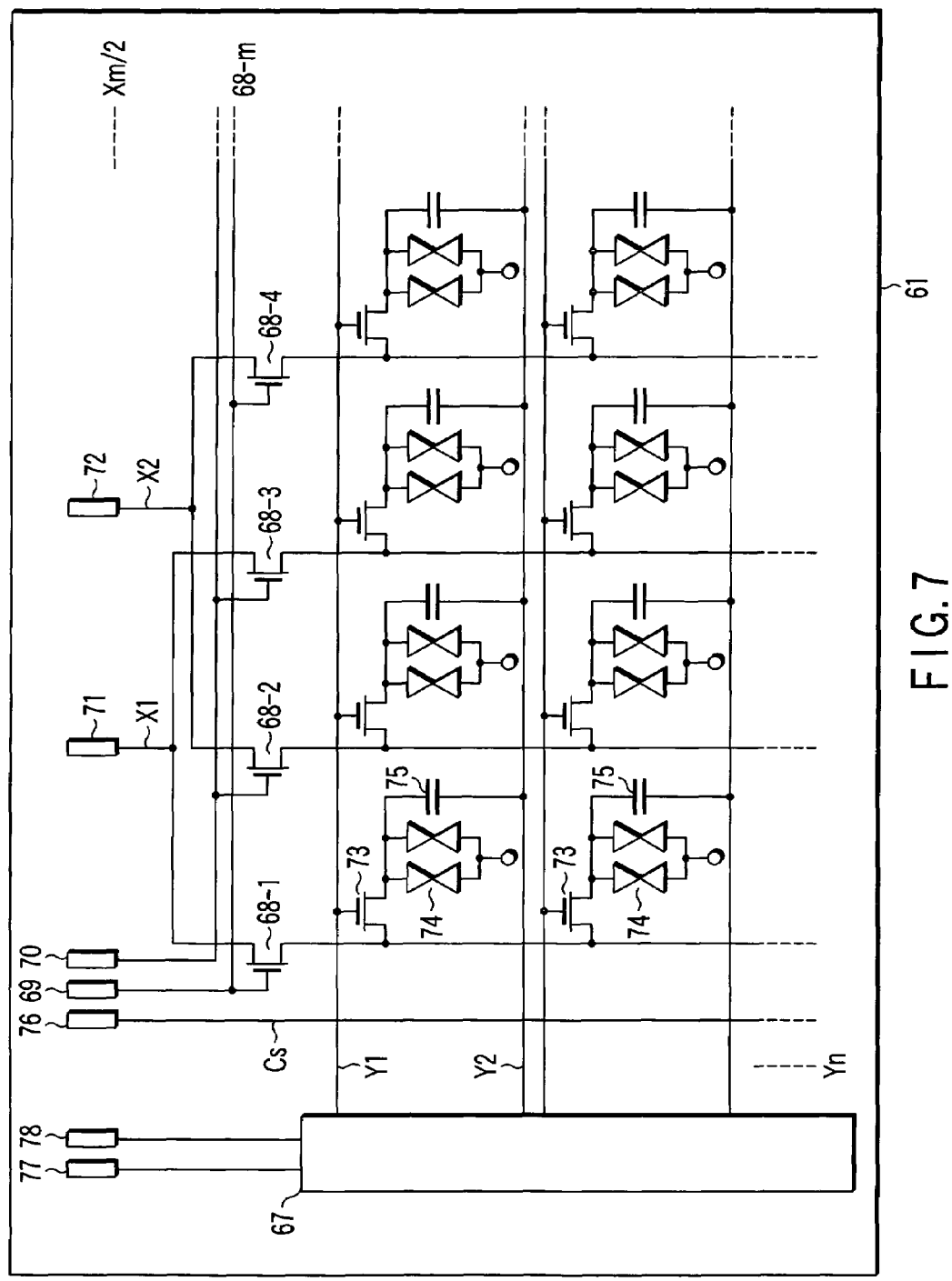
FIG. 7 is a diagram showing the circuit configuration of the liquid crystal display panel shown in FIG. 6.
Figure 9:
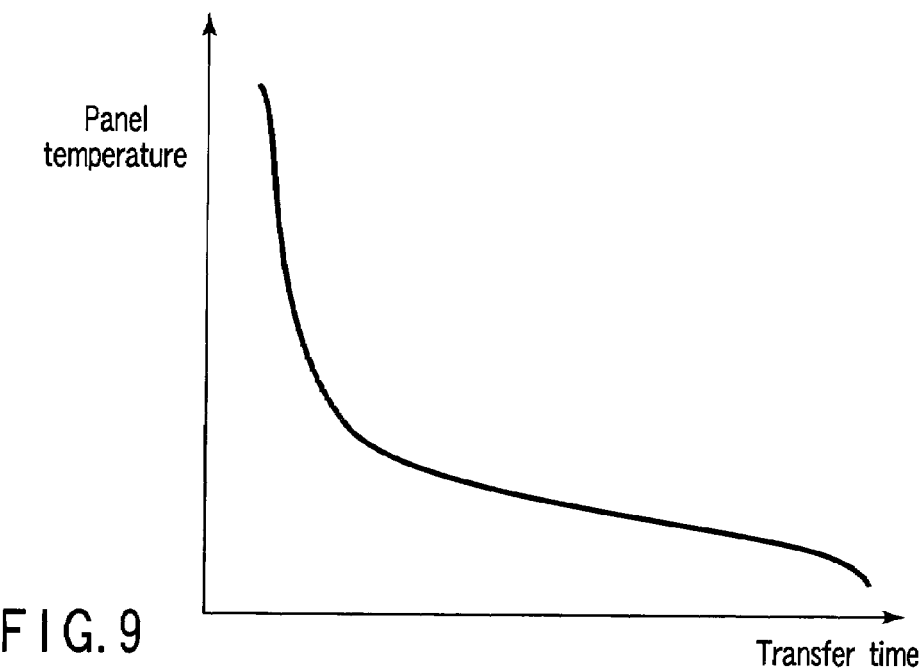
FIG. 9 is a graph showing transfer time characteristics of the liquid crystal display panel shown in FIG. 6.
Figure 10:
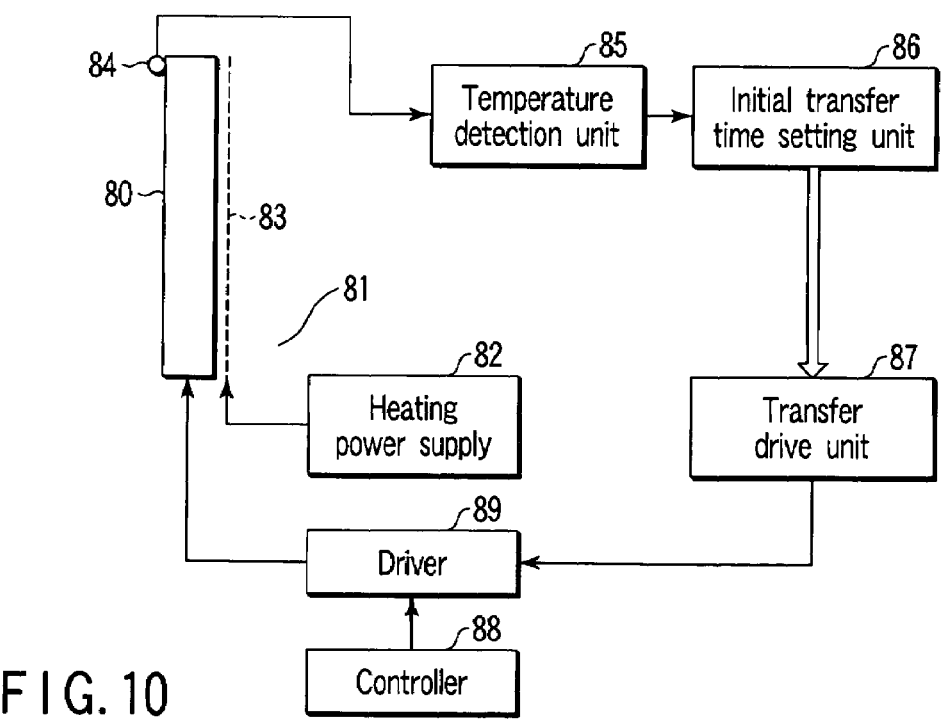
FIG. 10 is a diagram showing the circuit configuration of a liquid crystal display device comprising the liquid crystal display panel shown in FIG. 7.

That is, when the initial transfer time setting unit 17 and the transfer time switching unit 21 are connected to the temperature detecting unit 16, and a temperature equal to or higher than the predetermined temperature is detected by the temperature detecting unit 16, the transfer time is updated by utilizing the transfer time computed from a single item of heating transfer time characteristic data from the predetermined temperature to the reach of the transfer enable temperature, as shown in a modification of FIG. 5. In other words, when a transfer time after the predetermined temperature has been reached is set in advance, and the fact that the liquid crystal display panel 11 has reached the predetermined temperature is detected by the temperature detecting unit 16, transfer driving is automatically carried out at the transfer time set in advance by the transfer time switching unit 21.

With such a configuration, the transfer start elapsed time clocking unit 22 can be eliminated. In addition, an amount of data and information to be stored in the memory can be reduced, and thus, making it possible to simplify the configuration and to inexpensively produce equipment.

Although the above-described heater 14 is disposed next to the liquid crystal display panel 11, the heater 14 can be associated with a backlight (not shown) as the heating unit 12. Moreover, only a backlight can be provided instead of the heater 14. Various applications or modifications can occur without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a liquid crystal display panel including a liquid crystal layer for a display in an OCB mode;
   a heating unit which heats said liquid crystal display panel;
   a temperature detecting unit for detecting a temperature of said liquid crystal display panel;
   a time measuring unit which measures a heating time that the heating unit has operated; and
   a transfer drive circuit which applies a transfer drive voltage to said liquid crystal layer to transfer the alignment state of liquid crystal molecules from a splay alignment to a bend alignment in advance;
   wherein said transfer drive circuit is configured to determine a transfer time serving as an application period of the transfer drive voltage, on the basis of a relationship between the heating time and temperature which are obtained from said time measuring unit and said temperature detecting unit at a desired timing.

2. A liquid crystal display device according to claim 1, wherein said transfer drive circuit is configured to start application of the transfer drive voltage upon start of heating by the heating unit.

3. A liquid crystal display device according to claim 2, wherein said transfer drive circuit includes an initial transfer time setting unit which sets the transfer time for an expected rise in temperature and a transfer time switching unit which updates the transfer time when a predetermined temperature is detected by the temperature detecting unit.

4. A liquid crystal display device according to claim 3, wherein the initial transfer time setting unit is configured to set the transfer time according to an output of the temperature detecting unit.

* * * * *